United States Patent [19]
Kinneberg

[11] Patent Number: 6,020,028
[45] Date of Patent: Feb. 1, 2000

[54] SILANE ADHESION CATALYSTS

[76] Inventor: Bruce I. Kinneberg, 625 Marina Vista Ave., Martinez, Calif. 94553-1132

[21] Appl. No.: 09/092,693

[22] Filed: Jun. 5, 1998

[51] Int. Cl.$^7$ ............... B05D 1/36; B05D 3/02; B05D 7/02
[52] U.S. Cl. ............ 427/316; 427/322; 427/407.2; 427/412.5
[58] Field of Search ............... 427/407.2, 412.1, 427/412.5, 314, 316, 322

[56] References Cited

U.S. PATENT DOCUMENTS

| | | | |
|---|---|---|---|
| 2,814,572 | 11/1957 | Frye | 117/124 |
| 2,930,809 | 3/1960 | Jex et al. | 260/448.8 |
| 2,971,864 | 2/1961 | Speier | 117/124 |
| 3,350,345 | 10/1967 | Vanderbilt et al. | 260/41.5 |
| 3,873,352 | 3/1975 | Kitaj | 117/124 E |
| 4,529,618 | 7/1985 | Ponjee et al. | 427/82 |
| 4,857,366 | 8/1989 | Schumacher | 427/302 |
| 4,950,583 | 8/1990 | Brewer et al. | 430/311 |
| 5,314,562 | 5/1994 | McDonnell et al. | 156/314 |
| 5,413,867 | 5/1995 | Chang et al. | 427/387 |
| 5,470,658 | 11/1995 | Gasca et al. | 428/391 |

FOREIGN PATENT DOCUMENTS

| | | |
|---|---|---|
| 901131 | 3/1985 | Belgium . |
| 2440952 | 3/1975 | Germany . |
| 50-133241 | 10/1975 | Japan . |
| 60-28860 | 2/1985 | Japan . |
| 60-31533 | 2/1985 | Japan . |
| 60-47035 | 3/1985 | Japan . |
| 61-38662 | 2/1986 | Japan . |
| 61-82871 | 4/1986 | Japan . |
| 61-238828 | 10/1986 | Japan . |
| 63-128090 | 5/1988 | Japan . |
| 2093049 | 8/1982 | United Kingdom . |
| WO 84 03458 | 9/1984 | WIPO . |

OTHER PUBLICATIONS

E.P. Plueddemann, "Silane Coupling Agents, 2nd Edit.," xi+253 pp., Plenum Press, NY, 1991.

P. Walker, *J. Coating Technol.* 52, 49–61 (1980). "Organo Silanes as Adhesion Promoters for Organic Coatings."

*Primary Examiner*—Erma Cameron

[57] ABSTRACT

Alkanolamines intentionally incorporated with aminosilanes into surface films have been discovered to provide exceptional levels of adhesive performance when overcoated with any of a variety of paints and polymers. This invention is widely applicable to paints, including polyurethane coatings. It provides bonding to siliceous, polymeric, and other surface types. Practical methods for depositing the needed film from polar solvents are disclosed. Also disclosed is an evaluated general-purpose formulation. This appealing formulation provides cleaning and wetting on a great variety of surfaces and has balanced volatility, low toxicity, low corrosivity, long shelf life, and water miscibility and rinsability.

12 Claims, No Drawings

SILANE ADHESION CATALYSTS

BACKGROUND—FIELD OF INVENTION

This invention relates to the use of commercial aminosilane coupling agents in combination with bifunctional alkanolamine catalyst additives for improved adhesion of coatings and polymers to siliceous and polymeric surfaces.

BACKGROUND—GENERAL DESCRIPTION OF PRIOR ART

Silane coupling agents represent a nearly mature technology much studied for decades. The technology is reviewed by Plueddemann in "Silane Coupling Agents," Plenum Press 1991. The materials of commercial importance have the typical formula $R(CH_2)_3Si(X)_3$, where X is a hydrolizable group usually methoxy, but sometimes ethoxy or acetyl, and R represents various organic radicals. The major commercial articles obtainable from manufacturers such as Dow Corning Corporation, Union Carbide Corporation, and Hüls America, Inc., are, along with their conventional abbreviations: vinyltriacetoxysilane (VS), 3-chloropropyltrimethoxysilane (CPS), 3-glycidoxypropyltrimethoxysilane (GPS), 3-methacryloxypropyltrimethoxysilane (MPS), 3-mercaptopropyltrimethoxysilane (MGPS), 3-(N-styrylmethyl-2-aminoethylamino)-propyltrimethoxysilane hydrochloride (CSS), 3-aminopropyltriethoxysilane (APS), and N-(2-aminoethyl)-3-aminopropyltrimethoxysilane (AEAPS). CSS, APS, and AEAPS are aminosilanes. Additional silane coupling agents are also available from Hüls America, Inc., and others.

The major application for the silane coupling agents is to change the interface between dissimilar phases as in composites such as glass fiber reinforced resins or mineral-filled resins and elastomers. They are also used in adhesive, caulk, and sealant applications. Their use results in improved bonding, moisture resistance, and upgraded mechanical and electrical properties. They are usually applied to fillers as dilute solution or from the vapor phase and are also added directly to formulated products such as caulks from which the coupler diffuses to the contact surfaces during curing.

Water molecules diffuse through any plastic and thus will reach the interface in mineral-filled composites exposed to a humid environment. Diffusion is especially rapid through thin polymer films such as paints. This water at the interface greatly weakens the adhesive bond. In the case of paints, the effect of differential thermal expansion between a hard substrate and polymer coating is also more evident than with smaller-dimensioned fillers. Contraction stresses can cause cracking or peeling of such surface coatings. Very little has been published on specific applications of silanes in commercial coatings. Primer suppliers and coating manufacturers have historically considered their formulations proprietary and do not disclose use of silanes in their formulas.

It is generally accepted that silane-loaded epoxy finishes can achieve good water resistance on ceramic surfaces. Example are paints or inks used for directly printing on glass. Some experts think there is no available method for achieving similar results with urethane finishes without an epoxy undercoat. High performance industrial maintenance urethane coatings have life expectancies of some 10 years compared with about 6 years for competitive epoxies. An inexpensive method, such as applicant's invention, for permanently and directly adhering such standard urethanes to water-exposed siliceous and polymeric surfaces is especially desirable.

In the prior art, reference is made to "primers." These are typically strong silane solution containing 2% or more of solids in water or solvent. They are applied to metal or ceramic surfaces prior to adhesive bonding. Such primers typically produce a visible coating which forms a structural interface. This is unlike applicant's invention where the coating is from a more dilute solution and is so extremely thin that the finish is invisible to the unaided eye. The finish is typically not sticky and is detectable only to the trained touch by an increase in a smooth glass surface's frictional drag or to the skilled painter from the improved brush "hand" after treatment. No masking is required when applying this finish. Areas not subsequently overcoated are invisible, without consequence, and can usually be ignored.

In U.S. Pat. No. 4,857,366 Schumacher discloses that surface treatment compositions containing either amino- or sulfhydryl- silanes along with p-toluenesulfonic acid promote urethane sealant adhesion to both glass and painted surfaces. The p-toluenesulfonic acid is a corrosion-promoting and toxic strong acid unlike the alkaline catalysts of applicant's invention. Schumacher does not describe long-term moisture resistance tests, but it is understood in the art that ionic or hydrophilic substances at an interface promote moisture-induced weakness. Toluenesulfonates are quite ionic; long-term moisture resistance for thin coatings is accordingly questionable.

In U.S. Pat. No. 4,529,618 Ponjee et al. disclose that dipping of siliceous and other microlithographic inorganic substrates in dilute aqueous solutions of the aminosilanes APS and AEAPS provides excellent adhesion during the liquid processing of subsequently-deposited photoresists. Use of dilute (0.25–3.0%) water solutions is claimed to avoid deleterious polycondensation of the free trisilanol forms of the silanes. Unlike applicant's invention, no additives are used or claimed.

In U.S. Pat. No. 4,950,583 Brewer et al. disclose that adhesion of photoresists to microelectronics substrates is improved using a variety of new, non-amino-alkoxysilanes, but also a novel aminosilane, (aminoethylaminomethyl) phenylethyltrimethoxysilane. Deposition is by spincoating of 0.05–0.5% silane solutions in mixed isopropanol and water. In addition to the silane, these solutions contain an acid or base catalyst used in the conventional manner. As claimed, "the catalyst being effective to increase the bonding of the alkoxysilane and the combination being effective to increase the bond of a microelectronic coating to the substrate." Ethanolamine is used in the manner of a conventional amine additive and with silanes other than those of applicant's invention.

Base catalysts have long been known as additives to non-amino-silanes in alcohols to promote both alkoxy hydrolysis and subsequent oxane surface bonding. Amine catalysts are generally thought to be lost from the treated surface when the treatment solution evaporates. If they do not, they are potentially deleterious residues. It is now surprisingly discovered that alkanolamines intentionally incorporated with aminosilanes into surface silane films and not evaporated from the surface, later react to provide exceptional levels of adhesion performance when over-coated with any of a variety of polymers and paints.

BACKGROUND—AMINOSILANES

The aminosilanes are usually considered as a special group among the organosilane coupling agents. They are unique in that they include within each molecule at least one basic nitrogen capable of catalyzing the hydrolysis of the alkoxysilane groups by water to produce the highly reactive silane triol. The silane triols then actively condense (also catalyzed by such internal amine) with the exposed silanol groups on any contacting siliceous surface. They form oxane bonds to the surface and thereby create an adhesion-promoting film. With all silane coupling agents, the monomeric silane triols in solution also actively polymerize among themselves. The understanding in the art is that, once such polycondensation produces branching tetramers in solution, the adhesion-promoting property of deposited films usually falls, and precipitation from, or otherwise rapid decomposition of, the solution takes place. Although seemingly stable equilibria have been described, progression of polycondensation with time is usually a matter of chemical kinetics.

The useful lifetime of hydrolyzed silane solutions is usually short, unless special stabilizing factors are present. In the case of the aminosilanes, it is understood that in polar solvents the aminopropyl nitrogen internally cyclizes via hydrogen-bonding with one of the silanols. This somewhat stabilizes the molecules from branching polycondensation, especially in dilute solutions. Such solutions have extended useful lifetimes.

For forming tenacious aminosilane molecular films from water solutions, the art teaches that aminosilane solutions are by nature too alkaline and tend to deposit with nitrogen, rather than oxane, weakly bonding to a siliceous surface. This problem appears worst for aminosilanes like CSS with larger side chains. The aminosilanes are also known to contribute hydrophilic properties to the interface by supplying more amine functionality than can possibly react with the applied polymer at the interface. Remaining excess amine is hydrophilic and hydrophilic contamination is understood to cause poor water-resistance of the interface. For these reasons it is surprising to now discover that in dilute solutions, adding even more polar amine material in the form of residual alkanolamines has the opposite of this expected effect. In practice it results in an extremely water-resistant interface.

OVERVIEW OF INVENTION

I have discovered that addition of bases in the form of alkanolamines to dilute aminosilane solutions results in very stable and useful surface treatment solutions of high performance. Such solutions are easy to use, water-extendible and rinsable, low in toxicity, low in corrosivity, and show very versatile high-performance on ceramic, glass, and other siliceous, inorganic and metallic surfaces as well as on painted, polymeric, and other organic surfaces. Such treatment solutions impart a hitherto unknown level of moisture-resistant adhesion to subsequently applied polymers, including high-performance polyurethane paints. Adhesion of such urethanes coatings is so strong that the usefulness of their inherent durability can be maintained under wet and previously impossible conditions.

An additional objective of this invention is to provide practical, general-purpose bonding methods for paints and polymers. It is recognized in the art that the aminosilanes have potential as coupling agents for reacting with virtually all condensation-thermosetting polymers including urethanes, epoxies, phenolics, melamines, furans, alkydes, polyvinylchloride solutions and plastisols, and so on, as well as numerous thermoplastic resins. It is also recognized that coupling agents are useful for bonding polymers to polymers.

It has been overlooked by others that certain less reactive amine bases (including tertiary amines of this invention) may be adapted to catalytically increase the covalent bonding reactivity of the primary and secondary amines of the aminosilanes of prior art. It has been discover that such beneficial catalytic effects may be provided, without the deleterious effects produced by direct, simple addition, by adding such additional catalytic amines in the form of alkanolamines.

Aminosilane amines so activated with alkanolamines appear to condense ever more readily with uncured as well as hardened organic surfaces. The silanol groups of the aminosilanes, as well as the other hydroxyl groups variously present during curing, also appear to be additionally activated for condensations. For these reasons, the treatment composition of this invention are superior to the aminosilane compositions of prior art for bonding an unlimited variety of other paint- or polymer- to-substrate combinations. Such versatile applicability is essential for practical products for use with common coatings and surfaces frequently of mixed or unknown polymer type.

DETAILED DESCRIPTION OF INVENTION

Currently in the United States there are about 1500 establishments providing services under Standard Industrial Code (SIC) 7699-85, Bathtubs and Sinks-Repairing and Refinishing. There are some 5 major national franchises which provide training and materials. These franchises account for only about 15% of these establishments, most of which are very small. In addition to these, there are about 300 establishments offering closely related SIC 7699-73 services, Household Appliances-Refinishing. The materials and techniques of these trades are largely proprietary, and, given that there are also some 1300 paint manufacturers in this country, quite varied.

For refinishing porcelain enamel tubs, sinks, and ceramic tile, generally two coatings are applied to the cleaned surfaces. First an adhesive high-silane epoxy (either one or two-part) primer followed by a more durable two-part urethane or modified urethane automotive or maintenance finish. Sometimes a partial cure of the primer is required for good adhesion of the finish. The operational demands of surface preparation, masking, and then spray-application of two complex paints on close time schedule in cramped quarters causes finishing defects. The demands on product performance are also extreme. Process simplifications and performance improvements are obviously of interest and potential usefulness. Adhesion is a generally fickle phenomenon about which limited experiments are apt to suggest unwarranted conclusions. Secret testing within these industries was used to rigorously reduce this invention to practice.

TILE TESTING

Experienced operators use a "tile test" to evaluate coating systems. A system to be evaluated is applied to and cured on a common 4⅜ inch smooth, white, glazed square ceramic tile such as Florida Tile Division of Sikes Corp. No. 510698. This tile is then boiled in tap water with occasional inspection. In line with expectations of thermally-accelerated testing, adhesion of the coating after 72 hours of boiling approximates soaking at room temperature for about 5 years. A finish adhering after 72 hours of boiling is seen as meriting a 5-year guarantee to the customer. Very few systems in use can pass this test. An even more stringent variation of this test is to stop the timing and allow the tile to cool to room temperature every 8 hours. The use of a boiling temperature allows fair comparisons only when the glass transition temperatures of the polymers under examination are not exceeded. In such cases, a water bath thermostated to a lower temperature below such transitions should be used and exposure times extended according to the standard accelerated testing model.

When the paint to be used is chosen, and only the initial surface treatments are being compared, a single tile may be masked with 5/8 inch paper masking tape into 3 regions of equal area. Each area then receives a different initial treatment and record of this is maintained by marking the unglazed back of the tile with pencil. Care is also taken that such initial treatments also include the unglazed adjacent edges of the tile. When the boiled tile is examined, special attention is given to the paint's adhesion to these unglazed sides, as these are the usual first places for adhesion failure. If the paint still adheres to the glazed surface when boiling is terminated; further comparative rating of various treatments can be made by scraping the paint from the tile by hand with a mounted razor blade. When so scraped from the surface, any sign of chipping (adhesive rather than cohesive failure) is rated very poor. If no chipping is evident, the degree of hardness at the interface is positively rated. These methods allow the merits of treatment modifications to be relatively compared.

Tile tests were conducted with aminosilanes without additives. These baseline tests are reported for comparison with the superior results obtained when alkanolamines are also included. The baseline tile tests were done using a white-pigmented two-part Imron® polyurethane enamel (E.I. DuPont de Neumours & Co., Automotive Division, Wilmington, Del.) and the aminosilanes APS and AEAPS. The aminosilanes were separately dissolved in commercial isopropanol at the rate of 5.0 grams per liter and allowed to age a day, both with or without added water to promote hydrolysis. A new test tile, without any preliminary cleaning and as received from the manufacturer, was masked into test areas as described. The various test solutions and a pure isopropanol blank were then applied to separate areas by twice wiping with an appropriately saturated paper towel. The tiles were then briefly warmed with a cool (80° C.) heat gun, sprayed with Imron® in 3 successive very light coats, the masking tape stripped off, and the coated tiles cured overnight under a heat lamp. When subjected to boiling water, all these test coatings quickly failed by peeling within 10 hours of exposure. The performance was so poor that it was difficult to distinguish between the aminosilane treatments and the blank.

The following examples illustrate the invention:

EXAMPLE 1

Three surface treatment solutions were prepared by separately dissolving each ingredient in alcohol and then mixing each solution into the remaining alcohol in the amounts detailed in the following table.

| Component | Formula A | Formula B | Formula C |
| --- | --- | --- | --- |
| Aminosilane AEAPS | 3.5 g | 3.5 g | 3.5 g |
| N,N-Dimethylethanolamine | 1.4 g | — | — |
| N,N-Diethylethanolamine | — | 1.8 g | — |
| Triethylenediamine | — | — | 0.88 g |
| Isopropanol, commercial, to make: | 1.0 L | 1.0 L | 1.0 L |

These formulas were aged at least one day and then applied to masked test tiles, sprayed with Imron®, and cured as previously described. These tiles were then subjected to boiling in water with cooling every 8 hours, also as previously described. Results were as follows: After about 11 hours of boiling the coating on the glazed surface treated with Formula C developed cracks. Triethylenediamine is a low molecular bifunctional tertiary amine base known to be a powerful urethane polymerization catalyst. Even though it is a solid at room temperature, this amine has a high vapor pressure (20 mm Hg at 80° C.). It apparently did not fully volatized from the initial surface treatment film during the 80° C. air drying. It remained in the film and later diffused into the polyurethane finish where it interfered with a proper cure. As a result, the paint had increased hardness and reduced toughness. This apparently produced a coating which failed by cracking after the first thermal cycle. This trial illustrates that simply adding semi-volatile tertiary amines to an aminosilane treatment solution can improve adhesion, but can also undesirably alter the polymerization of the entire superimposed coating.

The boiling was continued for a total of 114 hours. At this point the polyurethane surface was hazing from water attack, but the polyurethane over the Formulas A- and B- treated glazed surfaces remained adherent. The tiles were cooled and the coatings examined with a razor. The paint on the Formula B-treated unglazed edges was found poorly adherent. Unlike the Formula A-treated unglazed edges, the Formula B-treated edges were subject to peeling when pried with the blade. On the glazed tile face destructive razor scraping produced only cohesive failure within the coatings. The Formula A interface was notably harder than the Formula B interface. The overall behavior of the superior Formula A in the tile test was astonishingly good.

EXAMPLE 2

The Formula A "invisible primer" of Example 1 performed amazingly well under controlled conditions. An objective of this invention is to provide a versatile product of wide utility. This requires the product have a long shelf life and work reliably with all common paint and substrate combinations—all this under varied field conditions and with varied application techniques. Repeated practical tests were instituted to confirm this for the formulation. Failure analysis was especially important for this purpose. The following was one of the very rare failures. As will be explained, this test revealed a need for controlling the water content of the formulation to achieve a long product shelf life.

A worn antique claw-foot porcelain-on-cast-iron bathtub was obtained from salvage. It was blocked up in a work shop. A bathtub and sink repairman proceeded to refinish it using usual methods. The only coatings to be used were a white-pigmented two-part Acrylic-Urethane automotive finish (Triangle Coatings, San Leandro, Calif.) and a freshly-made batch of Formula A of Example 1. Many of the materials and techniques of automotive body repair are used successfully for bathtub and sink refinishing.

The interior enamel surface of the tub was first cleaned by thoroughly scrubbing with an ordinary acidic urinal cleaner (Adhere Bowl Cleaner, RLX Chemical Co., So. San Francisco, Calif.) using a Scotchbrite® pad. The tub was then thoroughly rinsed with water and the porcelain wiped dry. Next the enameled surface was freed of any possibly lingering soap films and resins by lightly sanding with fine, 100 mesh sand paper. Chipped or pitted areas were wiped twice with a towel soaked with Formula A. Any condensing surface moisture was immediately evaporated using a common 80° C. hair blow dryer, and the chipped or pitted areas filled with an ordinary polyester automotive body repair putty (Evercoat Polyester Glazing Putty, Fiber Glass Evercoat Co., Cincinnati, Ohio). This filler was allowed to cure overnight before sanding level with the surrounding surface. Dust and filler residues were removed by wiping out the tub using a standard resin remover (R-M Wax and Silicone Remover, Inmont Division, BASF Corp., Mount Olive, N.J.). Formula A was next applied by wiping a freshly-saturated towel over the porcelain surface. Wiping was done twice to assure the entire surface were treated with this invisible film. Filler surfaces were also treated with Formula A and all surfaces—especially the filler—dried as before with a common hair dryer. The tub was then sprayed with the Acrylic-Urethane following the manufacturer's recommendations, cured under heat lamps overnight, and then polished.

Shortly after this successful demonstration a further experiment was tried. From trade experience, an imperfectly sprayed final finish needs removal and reapplication. It is usually removed with a commercial cold paint stripper, or else by very laborious scraping and abrasives. Commercial paint remover (Jasco Chemical Corp., Mountain View, Calif.) was applied to the finish. This did not work. The manufacturer confirmed that the remover lot was not defective. The remover partially stripped the Acrylic-Urethane, but a hard interphase remained adherent and could only be removed with scraping and abrasives. The tub was discarded. This test demonstrated that Formula A in practice produces an extremely adherent, durable, densely cross-linked, and solvent-resistant interphase when used with a polyurethane finish.

Given this remarkable demonstration, it was additionally surprising to discover that the same batch of Formula A rather suddenly reached its shelf life about two months after preparation. After expiration, the product changed from an adhesion promoter to a release agent. When used in the expired state, the resulting paint on a ceramic surface was so poorly adherent that it sloughed off on the cloth while being polishing after curing.

The expired formulation contained no precipitates. Amine was sequestered in soluble polymer. The water content of the original isopropanol was about 0.02% w/V. Early failure had resulted from insufficient water in the formulation. This prevented complete hydrolysis of all the AEAPS methoxy groups. When insufficient water is present, it then acts like trace water to catalyze the direct polycondensation of the methoxysilane groups. This is known chemistry for the water-induced curing of room-temperature-vulcanizable silicone rubber compositions. The stoichiometrically-required water content for complete hydrolysis of the 0.35% w/V AEAPS in Formula A is 0.085% w/V water in the isopropanol. Additional experiments indicated that when sufficient (about 0.12% w/V) water is originally present in the alcohol, Formula A preparations stored in high density polyethylene have a very desirable and commercially useful shelf life of between 4 and 5 years.

EXAMPLE 3

Continuing along the lines of Example 2, Formula A was tested on a number of surfaces typical of requested work in the bathtub and tile as well as the appliance refinishing trades. In addition to porcelain enameled metal fixtures, articles painted using Formula A and the Acrylic-Urethane included ceramic tile, porous tile grouts, bare concrete, filled acrylic artificial marble vanity sinks, Formica® and other plastic laminate counters, worn glass fiber reinforced polyester shower stall and hot tub surfaces, plated plumbing fittings and stainless steel articles, painted refrigerators and washing machines, and even a porcelain enamel stove top. Most of these articles were returned to customary use where, in all cases, the finish proved durable and permanent.

The only coating failure observes during these additional tests was one fall-out of a small triangular area of the paint on a porcelain surface. This area clearly had been missed during wipe-priming. Double wipe-priming is a preferred application technique as providing dedusting and final cleaning and is recommended twice done to avoid such problems with missed areas. Paper towels are adequate, but advantage of a more particle-free surface may be taken by wipe-priming using lint-free polyolefin clean room wipes such as product number 33651 KleenUps II® towels (Kimberly-Clark Corporation, Roswell, Ga.). Priming techniques are otherwise not critical and the potentially different film thicknesses obtained by different methods such as dipping, spraying or wiping, whether or not onto polished or roughened surfaces, did not prove of practical significance. The delay time between priming and finishing also was not important, but these two operation were usually performed on the same day. Performance thus proved very robust.

It is usually difficult to determine when a used surface is truly clean. Because of this and as a practical matter, most used articles were lightly sanded with very fine abrasive paper after common cleaning. When surfaces are known to be clean, there was no evidence that roughening provides significant additional benefit.

Other common alterations in processing methods gave equally good results. For example, Formula A was made up with 3A specially denatured ethanol substituting for the isopropanol. This solution was then lightly sprayed on cleaned and sanded painted appliance panels, allowed to evaporate, dried with a blow dryer, and then sprayed with pigmented Acrylic-Urethanes. Results were excellent.

An appealing feature of refinishing done in the described manner is that automotive urethanes are scorch-resistant. Laminated counters scorched from hot utensils, when coated in the above manner, were found to be more scorch resistant than when new. A refinished stove top returned to service performed well.

In the art of silanes, it is understood that aminosilanes sometimes bond poorly with uncured polyester resins. This is not the case with applicant's invention. Good bonding with polyester fillers was found. Reliably refinishing cured polyester surfaces is important in the maintenance trades. Such plastics are in common usage, but frequently deteriorate rapidly. Fiberglass reinforced polyester articles such as an aging hot tub as well as a shower stall floor so worn as to expose the glass reinforcement were both refinished and returned to successful and permanent service in continuous use. Given the improved durability of these finishes compared with the original polyester surface, these experiments suggest that these polyester products would have been improved by such a polyurethane coating when new. It is also evident that this invention is additionally useful for applying such protective coatings to polyester composites used in marine applications.

Experience indicates that adhesion of polymers applied to impervious siliceous surfaces in only slightly enhanced by the 80° C. heat treatment. Satisfactory results may be obtained on such surfaces without such treatment. As a practical issue, especially when working in damp or cold environments, evaporation of the primer may result in non-obvious and deleterious condensing moisture. To eliminate problems from this, the routine use of the warm air treatment is recommended. On porous or organic polymeric surfaces warm air treatment is additionally important for removing interstitial or dissolved solvent as well as for promoting amine condensations and strong bonding with organic surface functional groups. For such porous or less reactive surfaces, the heat treatment is more essential for best performance.

EXAMPLE 4

A clear glass bottle was wiped with Formula A, warm-air dried, masked, air brushed with Imron®, and heat-lamp cured. The result was a decorative, durably washable, and useful article. In this way glass articles may be durably and easily marked without using special inks or paints. In the decorative arts this offers many possibilities for easily creating airbrush and paintbrush works on glass surfaces. Durable faux stained glass goods—using both opaque, pigmented as well as clear, tinted paints—may be created freely without concern that primer on unpainted areas might mar the work. Unpainted primer on surfaces is invisible and does not collect dirt.

In a similar way, glass and ceramic surfaces may be treated with the aminosilane and alkanolamine mixtures of this invention for improved adhesion of adhesives, caulks, sealants, markings, decorations, appliques such as electrical defrosting grids on windows, silk screenings for back-illuminated glass display panels, and so on. This permits manufacture of durable goods by simplified process.

EXAMPLE 5

The use of this invention is not limited to situations requiring the highest adhesion performance from coatings. The invention may be offered as an inexpensive product for more mundane uses. This is illustrated by an additional experiment in which Formula A was applied like a wipe-on glass cleaner, without subsequent heating, to prepare half a glass pane for temporary exterior sign painting. A sign painter then painted a typical, temporary display on the glass using the usual water-base acrylic paints of his trade. The pane was left in exterior south exposure for 10 months, and then the paint was removed by usual methods. When removed, this intentionally soft paint had discolored somewhat from weathering, but was still adherent on both treated and untreated areas. The exposed unpainted treated area never showed any tendency to differentially collect environmental deposits and there was no undue difficulty removing the paint from the treated area. The painter noted that the treatment made brush application of the paint easier. He also expressed interest in having a product such as this for use on windows in locations where environmental factors make paint peeling a problem.

An interior house painter was asked to evaluate the usefulness of Formula A for eliminating the usual tedious sanding or special priming needed when overcoating old surfaces. The product was applied as a simple cleaning wipe, again without heating, to such problem items as plastic laminate and painted metal cabinet faces, shiny previously enamel-painted molding and woodwork, and decorative ceramics needing matching finish. Paints used were domestic products (Kelly-Moore Paint Co., San Carlos, Calif.) and included water-based acrylic, oil-based alkyd, and low VOC water-based enamel formulations. In all cases, scratch-testing of the final finishes showed them well-adherent with no tendencies to chip from these surfaces. The painter was also pleased with the quick simplicity of this preparation method and expressed interest in seeing such a product commercially available.

Conclusions, Ramifications, and Scope

It is disclosed how a new adhesion-promoting surface treatment may be accomplished with a formulation of balanced properties suitable for general-purpose use. For specific applications, it will be obvious to those skilled in the art that the methods described can be modified in many ways from the examples given without departing from the scope of the invention. It is anticipated that embodiments of this invention for specific or restricted applications may be created in ways providing best properties for specific purposes.

In the disclosed general-purpose embodiment, advantage is taken by formulating a treatment composition in a moist lower alcohol such as ethanol, or less expensive isopropanol, as providing both cleaning and good wetting on a great variety of surfaces, balanced volatility, low toxicity, low corrosivity, long solution shelf life, and water miscibility and rinsability. Spills may be easily cleaned up with water. Optional additives such as colorants, wetting agents, and buffers may also be included. Substitutions by or admixtures with other polar solvents including glycol ethers or even aprotic polar solvents like tetrahydrofuran, dimethylformamide, or 1-methylpyrrolidone may be used to alter evaporation rate and substrate solvency, amine reactivity, and thereby adhesion on specific substrates. Both aminosilanes and alkanolamines are typically heat resistant and capable of withstanding higher drying temperatures than 80° C. Use of more aggressive and less volatile solvents and higher drying temperatures should be especially beneficial for bonding to more inert polymer surfaces. Under such circumstances, normal experimentation may also reveal bonding improvements by departing from a one-to-one molar ratio of aminosilane to alkanolamine of the general-purpose formulation.

The invention is adaptable for coating or bonding common hydrophilic and porous surfaces such as concrete and masonry as well as wood and cellulosic products. These are potentially large-scale uses where lowest material cost as well as regulatory considerations such as low VOC emissions may be of greatest importance. It is evident that only an extremely thin film of the alkanolamine and aminosilane mixture is essential for performance. Treatment solutions of this invention may therefore be sprayed as solutions so diluted as to attain the most economical and thinnest performing surface layer. Aqueous solutions offer additional advantage.

For concrete, a reasonable process perfectible by routine experiment is as follows: The surface is first cleaned of non-adherent contamination by customary methods and the bare, wet surface freed of carbonates and excess cations by acid-washing and thorough water-rinsing. It is then allowed to air dry. The shelf-stable composition of Example 1, Formula A, or a more concentrated modification, is diluted on the spot into a 10-, 20-, or even 100-fold volume of pure water, also containing possible additives such as a wetting agent and a volatile buffer. This solution is mixed and the concrete immediately sprayed saturating its surface. The surface is then allowed to air dry in a day or so; forced air drying of the surface may or may not be employed. The choices here largely depend on the environment and the characteristics of the subsequent coating. The final coating is then applied. An alternate inexpensive embodiment of this invention—also providing the lowest VOC emissions—would be to supply separate, premeasured alkanolamine, aminosilane, and additive solutions. These would simply be mixed into a specified volume of pure water on a job site, and immediately sprayed as just described.

The use of silane coupling agents with wood and cellulosics is known feasible in the art. Cellulose in many ways resembles silica. Both have a hydroxylated surface with an isoelectric point of about 2. As with concrete, development of specialty modifications of this invention for improving adhesion to wood and cellulosics is anticipated. Both inexpensive restorative methods for weathered wood as well as improved bonding techniques for high-performance protective coatings are envisioned.

Chemically-resistant bonding of glass fiber filter beds remains a problem. Chemical exposure tends to destroy the polymer bonding used in HEPA filters and promotes very deleterious fiber shedding into the clean air stream. Improved urethane binders now appear possible with this invention. Similarly, this invention may find application in older areas of silane usage such as for improved performance of reinforcements and fillers in thermosetting polymers.

Definitions

Aminosilanes are substances corresponding to the formula:

$R^2NH(CH_2)_3Si(OR^1)_3$ in which $R^1$ is $CH_3$— or $C_2H_5$— or another lower alkyl or alkylacyl group, and $R^2$ is H— or an alkyl group or $R^3NH(CH_2CH_2)$—, and $R^3$ is H— or an alkyl group or $CH_2CH(C_6H_4)CH$—.

Such aminosilanes are available from Dow Corning Corporation, Midland, Mich.; Hüls AG, Marl, Germany; Aldrich Chemical Company, Milwaukee, Wis.; and from others.

Alkanolamines are substance containing one amino nitrogen and one hydroxyl group and corresponds to the formula:

$R^1R^2N(R^3)OH$ in which $R^1$ and $R^2$ are independently H— or lower alkyl of from 1 to 3 carbons in length, and $R^3$ is an aliphatic or —$(CH_2)_2O(CH_2)_2$— linking group of from 2 to 5 atoms in length.

Such alkanolamines are available from Aldrich Chemical Company, Milwaukee, Wis., and from others. Alkanolamines of lower molecular weight and containing strongly basic tertiary amine functionality are preferred.

What is claimed is:

1. A method for treatment of a surface so as to provide strong and moisture-resistant adhesion of paint or thermosetting polymer applied thereto, comprising:

applying to the surface a solution of from about 0.15 to about 15 grams per liter of aminosilane and about 0.06 to about 15 grams per liter of alkanolamine, dissolved in a solvent selected from the group consisting of polar solvents, water, or mixtures thereof, thereafter contacting the said surface with the uncured paint or fluid polymer and then allowing the uncured paint or fluid polymer to cure.

2. The method of claim 1 where said treated surface is heated prior to contact with said uncured paint or fluid polymer.

3. The method of claim 1 where said solvent is selected from the group consisting of water, methanol, ethanol, and isopropanol or mixtures thereof.

4. The method of claim 1 where aminosilane is selected from the group consisting of 3-aminopropyltriethoxysilane, N-(2-aminoethyl)-3-aminopropyltrimethoxysilane, or mixtures thereof.

5. The method of claim 1 where aminosilane and alkanolamine are in about 1.0 to 1.0 molar ratio.

6. The method of claim 1 where aminosilane and water in said solution are mixed in about 1.0 to 3.0 or greater molar ratio.

7. The method of claim 1 where said solution is obtained by mixing about 3.5 grams N-(2-aminoethyl)-3-aminopropyltrimethoxysilane per liter and about 1.4 grams 2-(N,N-dimethylamino)ethanol per liter and about 1.2 grams water per liter, all in isopropanol solvent.

8. The method of claim 1 where alkanolamine molecules contain only tertiary nitrogen.

9. The method of claim 1 where said paint is a polyurethane paint.

10. The method of claim 1 where said surface is a siliceous surface.

11. The method of claim 1 where said surface is a cured polyester polymer.

12. The method of claim 1 where said solution further includes additives selected from the group consisting of colorants, wetting agents, buffers, or mixtures thereof.

* * * * *